(12) United States Patent
True et al.

(10) Patent No.: US 6,805,396 B2
(45) Date of Patent: Oct. 19, 2004

(54) COVER FOR THE REAR BAG COMPARTMENT OF A GOLF CART

(75) Inventors: Dorian Thurston True, Augusta, GA (US); Marion Lee Jones, August, GA (US)

(73) Assignee: Carolina Covertech, Inc., North Augusta, SC (US)

( * ) Notice: Subject to any disclaimer, the term of this patent is extended or adjusted under 35 U.S.C. 154(b) by 17 days.

(21) Appl. No.: 10/080,270

(22) Filed: Feb. 21, 2002

(65) Prior Publication Data

US 2002/0129846 A1 Sep. 19, 2002

Related U.S. Application Data

(60) Provisional application No. 60/271,007, filed on Feb. 21, 2001.

(51) Int. Cl.[7] ............................... B60J 7/08; B60P 7/02
(52) U.S. Cl. ............................... 296/100.14; 135/88.01; 280/DIG. 5
(58) Field of Search ........................... 135/88.07, 88.09, 135/88.14, 88.15, 132, 136, 88.05, 88.01; 280/DIG. 5; 296/100.14, 111

(56) References Cited

U.S. PATENT DOCUMENTS

| | | | |
|---|---|---|---|
| 179,392 A | | 7/1876 | Ayers |
| 194,061 A | * | 8/1877 | Thompson .................. 296/102 |
| 208,564 A | | 10/1878 | Bowers |
| 621,615 A | | 3/1899 | McConnell |
| 1,360,407 A | | 11/1920 | Hughes et al. |
| 2,598,940 A | | 6/1952 | Robie |
| 3,152,707 A | | 10/1964 | Rey |
| 3,371,672 A | * | 3/1968 | Hale et al. .................. 114/361 |
| 3,908,777 A | | 9/1975 | Davidson |
| 4,008,874 A | | 2/1977 | Conway, Jr. |
| 4,332,415 A | | 6/1982 | Williams |
| 4,469,114 A | * | 9/1984 | Kelley et al. ............... 135/133 |
| 4,621,859 A | | 11/1986 | Spicher |
| 4,641,879 A | | 2/1987 | Kassai |
| 4,681,362 A | * | 7/1987 | Taylor ....................... 296/78.1 |
| 4,773,694 A | | 9/1988 | Gerber |
| 4,830,037 A | * | 5/1989 | Held ......................... 135/88.09 |
| 4,846,524 A | | 7/1989 | Gerber |
| 6,216,714 B1 | * | 4/2001 | Tucker ..................... 135/88.01 |
| 6,220,647 B1 | * | 4/2001 | Winkler .................. 296/100.14 |
| 6,227,217 B1 | | 5/2001 | Peta |
| 6,227,603 B1 | * | 5/2001 | Brock .................... 296/100.14 |
| 6,416,109 B1 | * | 7/2002 | Tyrer et al. ............. 296/100.11 |
| 6,471,281 B1 | * | 10/2002 | Tyrer et al. ............. 296/100.11 |
| 6,481,780 B2 | * | 11/2002 | Dolan et al. ............ 296/100.18 |
| 6,601,904 B2 | * | 8/2003 | Winkler .................. 296/100.14 |
| 6,663,161 B1 | * | 12/2003 | Tyrer ..................... 296/100.11 |
| 6,663,162 B1 | * | 12/2003 | Tyrer ..................... 296/100.14 |
| 2002/0041106 A1 | * | 4/2002 | Winkler ....................... 296/70 |
| 2004/0026955 A1 | * | 2/2004 | Dolan et al. ........... 296/100.01 |
| 2004/0027373 A1 | * | 2/2004 | Jacquot et al. .............. 345/730 |

FOREIGN PATENT DOCUMENTS

| | | | |
|---|---|---|---|
| DE | 3517967 A1 | | 11/1985 |
| JP | 11216215 A | * | 8/1999 ........... A63B/55/08 |

* cited by examiner

*Primary Examiner*—Robert Canfield
(74) *Attorney, Agent, or Firm*—Stephen M. Schaetzel; Catherine E. Fienning; Kilpatrick Stockton LLP

(57) ABSTRACT

The invention is an apparatus and methods for covering the rear bag compartment of a golf cart. The invention is configured for attachment to a support frame of a golf cart, wherein the support frame supports a hard roof top for the golf cart. The invention includes a stationary frame member, a movable frame member, and a cover. The stationary frame member is configured for mounting to the support frame of the golf cart. The movable frame member is configured for mounting to the stationary frame member, and further configured to pivotably rotate over a portion of the rear compartment of the golf cart. The cover is configured for mounting to the movable frame member so that when the movable frame member rotates over a portion of the rear compartment of the golf cart, the cover covers a portion of the rear compartment of the golf cart.

21 Claims, 6 Drawing Sheets

COVER FOR THE REAR BAG COMPARTMENT OF A GOLF CART

CROSS REFERENCE TO RELATED APPLICATIONS

This application claims priority to U.S. Provisional Serial No. 60/271,007, filed Feb. 21, 2001.

FIELD OF THE INVENTION

The invention relates generally to golfing accessories, and relates more particularly to a protective attachment for a golf cart.

BACKGROUND OF THE INVENTION

Golfing is a popular pastime for many people of all ages. Golfers occasionally use a motorized golf cart to transport their golf equipment while playing golf. Many golf carts include a rear compartment into which a golf bag and clubs can be positioned during the use of a cart. Commonly, the rear compartment is uncovered, even if the cart includes a top section for covering the seating compartment of the cart. Hence, the golf bag and clubs positioned in the rear compartment of the cart are unprotected from weather, elements, or precipitation, such as rainfall. A golfer's grip on his clubs, and his game, can be adversely affected if the grips of his clubs become wet. Thus, it would be desirable for protecting a golfer's bag and clubs from weather precipitation while the bag and clubs are positioned in the rear compartment of the golf cart.

At least one type of golf cart cover that attaches to conventional golf carts provides protection to a golf bag and clubs positioned in a rear compartment of the golf cart. However, a user's access to other accessories in the rear compartment of the golf cart can be hindered by the positioning of the cover with respect to the cart. Thus, there is a need in the art for a golf cart cover that does not interfere with a user's access to the rear compartment of the cart, yet provides a cover for the rear compartment.

Furthermore, there is another need in the art to provide an improved attachment to a golf cart that connects to the golf cart in a relatively quick and simple manner.

Yet another type of golf cart cover that attaches to conventional golf carts attaches directly to the roof of a golf cart. Unfortunately, this type of golf cart cover tends to sway back and forth relative to the cart, and has relatively little structural support. The movement of the golf cart, combined with occasional or steady winds, causes this type of golf cart cover to vibrate and shake, causing unpleasant noise, vibration, or otherwise potentially damaging clubs or other accessories carried in the rear compartment of the golf cart. Therefore, there is a need in the art to provide an attachment to a golf cart that has improved structural support.

SUMMARY OF THE INVENTION

The invention meets the needs above. The invention provides a golf cart cover that does not interfere with a user's access to the rear compartment of the cart, yet provides a cover for the rear compartment. Furthermore, the invention provides an improved attachment to a golf cart that can be connected to the golf cart in a relatively quick and simple manner. Finally, the invention provides an attachment to a golf cart that has improved structural support.

Generally described, the invention is an apparatus for covering the rear bag compartment of a golf cart. The apparatus is configured for attachment to a support frame of a golf cart, wherein the support frame supports a hard roof top for the golf cart. The apparatus includes a stationary frame member, a movable frame member, and a cover. The stationary frame member is configured for mounting to the support frame of the golf cart. The movable frame member is configured for mounting to the stationary frame member, and further configured to pivotably rotate over a portion of the rear compartment of the golf cart. The cover is configured for mounting to the movable frame member so that when the movable frame member rotates over a portion of the rear compartment of the golf cart, the cover covers a portion of the rear compartment of the golf cart.

More particularly described, the invention includes a stationary main frame connected to the rear support frame of a golf cart. The stationary main frame includes a U-shape frame with a pair of arm tubes, and a connecting tube between the arm tubes. The connecting tube mounts to the rear support frame of the golf cart. A movable frame connects to the stationary main frame. The movable frame includes a U-shape piece with two arm bars. At least one arm bar connects to the stationary main frame. A connecting bar connects between the two arm bars so that the movable frame can rotate over a portion of the rear compartment of the golf cart. A cover retainer strip connects to the stationary main frame. The cover retainer strip includes an elongate strip, and a channel recess extending along a portion of the elongate strip. A cover connects to the cover retainer strip. The cover extends from the channel recess and over the movable frame when the movable frame is rotated over a portion of the rear compartment of the golf cart.

In one aspect of the invention, the invention is a method for covering a rear compartment of a golf cart having a support frame to support a hard roof top over the golf cart. The method includes mounting a stationary frame member to a support member of the support frame. Next, the method includes mounting a movable frame member to the stationary frame member, the movable frame member configured to rotate to cover a portion of the rear compartment of the golf cart. Finally, the method includes mounting a flexible cover to the movable frame member so that when the movable frame member covers a portion of the rear compartment of the golf cart, a portion of the flexible cover covers a portion of the rear compartment of the golf cart.

In yet another aspect of the invention, the invention is a method for covering a rear compartment of a golf cart having a support frame to support a hard roof top over the golf cart. The method includes rotating a movable frame member relative to a stationary frame member. The stationary frame member is configured to mount to the support frame, and the movable frame member is configured to cover a portion of the rear compartment of the golf cart.

DETAILED DESCRIPTION OF DISCLOSED EMBODIMENTS

The invention provides a golf cart cover that does not interfere with a user's access to the rear compartment of the cart, yet provides a cover for the rear compartment. Furthermore, the invention provides an improved attachment to a golf cart that can be connected to the golf cart in a relatively quick and simple manner. Finally, the invention provides an attachment to a golf cart that has improved structural support.

Figure 1:
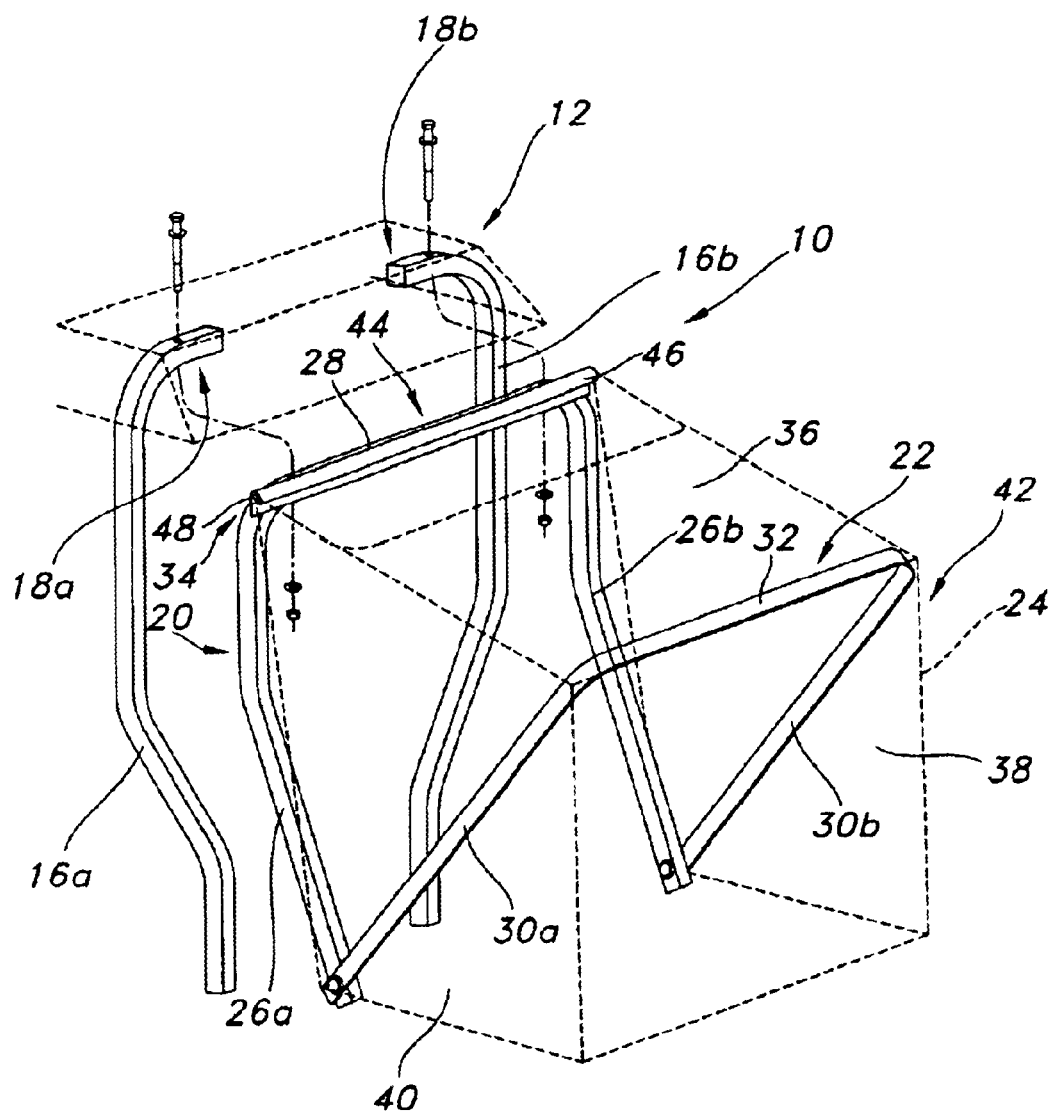
FIG. 1 is an exploded perspective view showing an embodiment of the invention connected to a support frame of a motorized golf cart.

Turning now to the drawings in greater detail, where numerals represent detailed features of the invention, FIG. 1 illustrates a motorized golf car hardtop 5 and an exploded perspective view of invention 10 that can be connected to an upper portion of a rear support frame 12 for the hardtop 5 of a motorized golf cart. The rear support frame 12 of the motorized golf cart includes two vertical arms 16a,b with a corresponding top horizontal portion 18a,b extending from the upper portion of each vertical arm 16a,b, with the horizontal portions 18a,b extending towards each other and parallel with the rear portion of the cart.

The invention 10 is a cover for the rear bag compartment of a motorized golf cart that includes a stationary main frame 20, a movable frame 22, and a cover 24. Typically, the stationary main frame 20 connects to the upper portion of a rear support frame 12 of the motorized golf cart. The cover 24 connects to the movable frame 22, and the movable frame 22 connects to the stationary main frame 22 so that both the movable frame 22 and cover 24 can pivot with respect to the stationary main frame 20 and the motorized golf cart.

A stationary main frame 20 can be a square-"U-shaped" frame made from approximately 1" square iron, aluminum or similar type of metal tubing. The stationary main frame 20 includes a pair of aim tubes 26a,b and a connecting tube 28 disposed between the arm tubes 26a,b. Each arm tube 26a,b is slightly angled at the middle portion of each arm tube 26a,b. The connecting tube 28 is substantially straight along its length. Typically, the connecting tube 28 is oriented in a substantially horizontal position, and is substantially parallel with the top horizontal portions 18a,b of the rear support frame 12. When the connecting tube 28 is oriented in such fashion, the arm tubes 26a,b extend downward from each end of the connecting tube 28 so that the arm tubes 26a,b are oriented substantially parallel with, but not connected with, the vertical arms 16a,b of the rear support frame 12. The connecting tube 28 is then connected only to the bottom side of each of the top horizontal portions 18a,b of the rear support frame 12. Holes machined through the connecting tube 28 and the top horizontal portions 18a,b of the rear support frame 12 so that mounting bolts or hardware can secure the connecting tube 28 to the top horizontal portions 18a,b of the rear support frame 12. When the connecting tube 28 is secured to the top horizontal portions 18a,b of the rear support frame 12, the stationary main frame 20 remains in a relatively fixed position with the respect to the rear support frame 12. In this manner, the stationary main frame 20 is connected only to the horizontal portions 18a,b of the rear support frame 12 and is not connected in any manner to the vertical arms 16a,b of the rear support frame 12.

In some instances, the stationary main frame 20 can be configured with a quick-connect type fittings 29 to permit rapid connection and disconnection of the stationary main frame 20 with the upper portion of the rear support frame of a motorized golf cart. This provides a user with the option of rapidly connecting the stationary main frame 20, the movable frame 22, and the cover 24 when the invention 10 is needed, or alternatively, disconnecting the stationary main frame 20, the movable frame 22, and the cover 24 when the invention 10 is not needed. Quick-connect type fittings can include, but are not limited to, a conventional bolt with a corresponding nut, or any other type of device that can be used to connect a stationary main frame 20 to a portion of the rear support frame 12 of a motorized golf cart in a relatively quick manner without the need for mechanized tools or equipment.

A movable frame 22 can be a square-"U-shaped" piece made from approximately 1" flat iron, aluminum or similar type of material. The movable frame 22 includes two arm bars 30a,b and a connecting bar 32 disposed between the each arm bar 30a,b. Each arm bar 30a,b is substantially straight along its length. The connecting bar 32 is substantially straight along its length. Typically, the connecting bar 32 is oriented in a substantially horizontal position, and is substantially parallel with the connecting tube 28 of the stationary main frame 20. When the connecting bar 32 is oriented in such fashion, the arm bars 30a,b extend away from opposing ends of the connecting bar 32 so that each arm bar 30a,b can pivotably connect with an open end of a corresponding arm tube 26a,b. The arm bars 30a,b can then be connected to the stationary main frame 20. Holes machined through the open ends of the arm bars 30a,b and through the open ends of the corresponding arm tubes 26a,b are sized for connecting bolts or hardware to pivotably connect the arm bars 30a,b to a corresponding arm tube 26a,b. When the arm bars 30a,b are secured to the arm tubes 26a,b, the movable frame 22 can pivot with respect to the stationary main frame 20.

The cover 24 can be made of collapsible or flexible material such as plastic, vinyl, canvas, or other similar types of material. The cover 24 includes a cover retainer bar 34 along one edge of the cover 24 that can be used to support the cover 24 in a position relative to the stationary main frame 20. For example, the cover 24 can be stretched between the connecting tube 28 and the movable frame 22 so that at least one portion of the cover 24 remains stationary with respect to the stationary main frame 20, and another portion of the cover 24 can pivot or move concurrently with the movable frame 22 when the movable frame 22 pivots with respect to the stationary main frame 20.

Typically, the cover 24 is made from canvas panels and has a clear plastic window in one or more of the canvas panels. For example, the cover 24 can be a four-panel, box-shaped cover with a clear plastic window in the rear panel. The box-shaped cover includes a cover retainer bar 34, a top panel 36 connected to a rear panel 38, and a left side panel 40 and right side panel 42, both connected to the top panel 36 and rear panel 38. The side 44 of the top panel 36 that is not connected to an adjacent panel 38, 40, 42 incorporates a cover retainer bar 34 that can connected to or stitched within the unconnected side 44 of the top panel 36. A cover retainer bar 34 can be a round plastic cord that is approximately ⅜" diameter. The box-shaped cover is fit over the movable frame 22, with the cover retainer bar 34 of the top panel 36 operable to connect to the stationary main frame 20. Since the box-shaped cover is manufactured from a fabric-type material, the cover 24 remains flexible when the movable frame 22 pivots with respect with the stationary main frame 20.

The invention 10 can also include a cover retainer strip 46 connected to the stationary main frame 20. Typically, the cover retainer strip 46 is a piece of flat corner bar with a recess 48 machined into the length of the bar. The cover retainer strip 46 is substantially straight along its length. The recess 48 which is typically a "C-shaped" channel is sized to receive the corresponding cover retainer bar 34 along the unconnected side 44 of the top panel 36 of the cover 24.

When the cover retainer strip 46 is positioned substantially horizontal and parallel with the connecting tube 28 of the stationary main frame 20, the cover retainer strip 46 can be connected to the connecting tube 28. Conventional bolts or other connectors can be used to connect the strip 46 to the connecting tube 28. When the cover retainer strip 46 is secured to the connecting tube 28, the recess 48 is oriented towards the movable frame 22 and the cover 24. The cover retainer strip 46 and cover retainer bar 34 cooperate to support the cover 24 from the recess 48. When the cover retainer bar 34 is inserted into and along the length of the recess 48, the cover retainer bar 34 and adjacent cover 24 are held securely against the cover retainer strip 46. Other configurations of the cover retainer strip 46, the cover retainer bar 34, and the recess 48 exist to connect the cover 24 to the cover retainer strip 46.

Note that the cover 24 can also include Velcro™ (hook and loop) straps (not shown) or other similar types of straps or tie downs to further secure the cover 24 to the cover retainer strip 46 in a non-operation upright position, the stationary main frame 20, or to the top portion of the rear support frame 12. Velcro™ (hook and loop) straps can be connected to the top panel of the cover 24, and can be wrapped around the cover retainer strip 46, the stationary main frame 20, or the top portion of the rear support frame 12 to support the cover 24 in a position relative to the stationary main frame 20.

Figure 2:
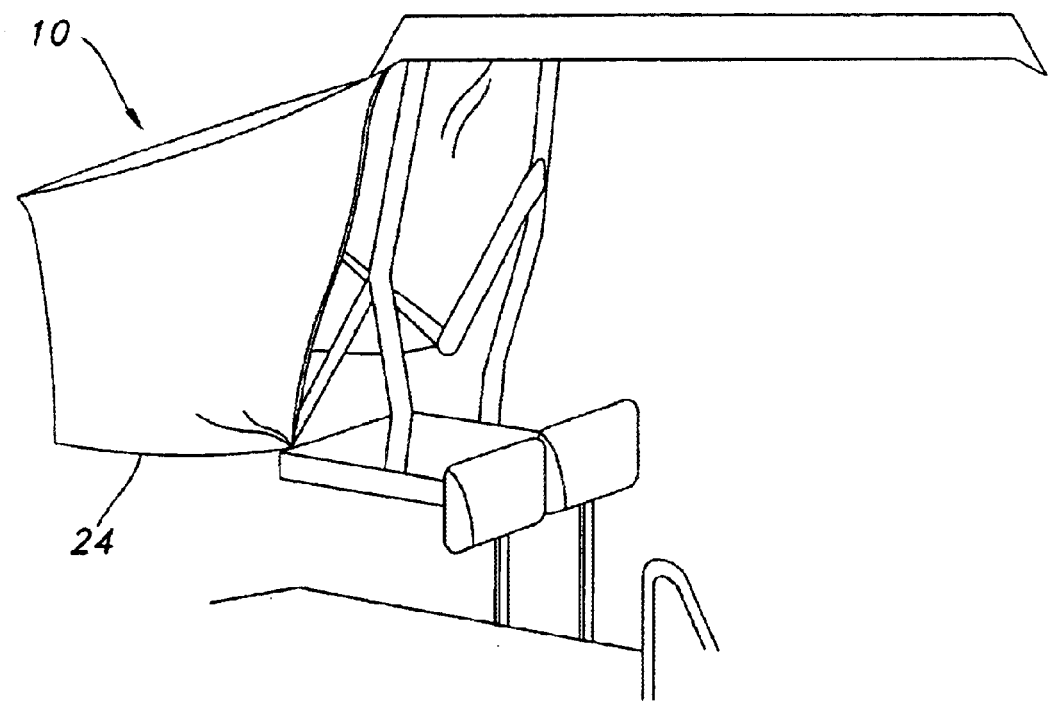
FIG. 2 is a rear view of the embodiment in FIG. 1 shown in a deployed or operative position.

FIG. 2 illustrates the invention 10 as described in FIG. 1 in a deployed or operative position. Initially, when the invention 10 is not in use, the movable frame 22 (as shown in FIG. 1) can be pivoted upward so that the connecting bar 32 of the movable frame 22 is adjacent to the connecting tube 28 of the stationary main frame 20. Thus, when the invention 10 is not in use, the cover 24 is not deployed over the rear compartment of the golf cart, and when positioned in the non-operative upright position, allows a user such as a golfer to access the rear bag compartment of the golf cart.

When the movable frame 22 is pivoted downward from the upper portion of the rear support frame 12 of the golf cart, the cover 24 cooperates with the movable frame 22 and extends downward and over the rear compartment of the golf cart as shown in FIG. 2. Typically, the shape or design of the cover 24 limits the downward movement of the movable frame 22 to the intersection between the top panel 36 and the rear panel 38 of the cover 24, as shown in FIG. 1. Thus, when deployed, the cover 24 provides protection from the weather and elements for objects such as golf clubs and golf bags stored in the rear compartment of the golf cart. A user such as a person sitting in the front portion of the golf cart can still access the rear compartment of the golf cart even when the framed rear bag cover 10 is in a deployed position.

Figure 3:
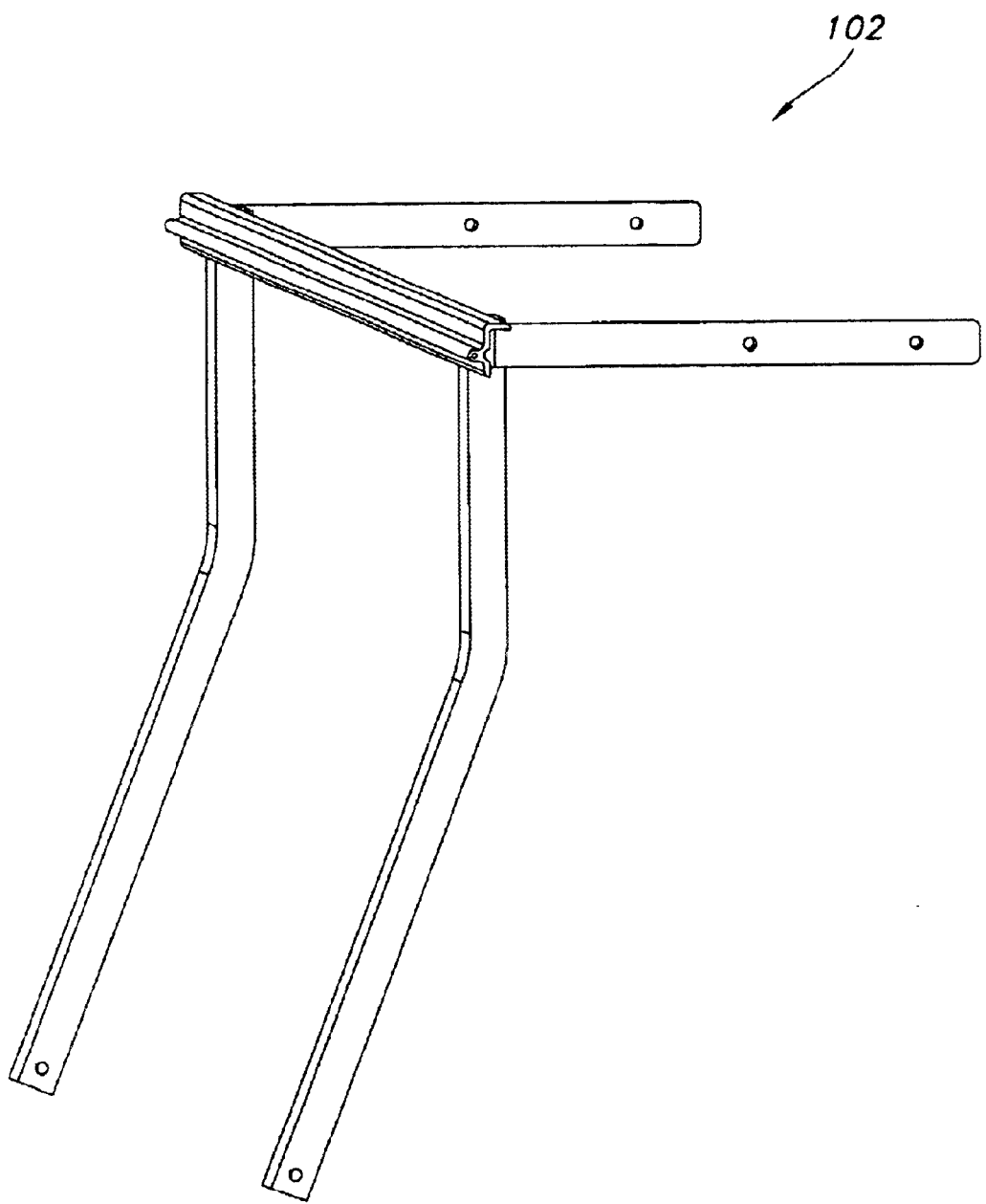
FIG. 3 is a perspective view illustrating another embodiment of the invention.
Figure 4:
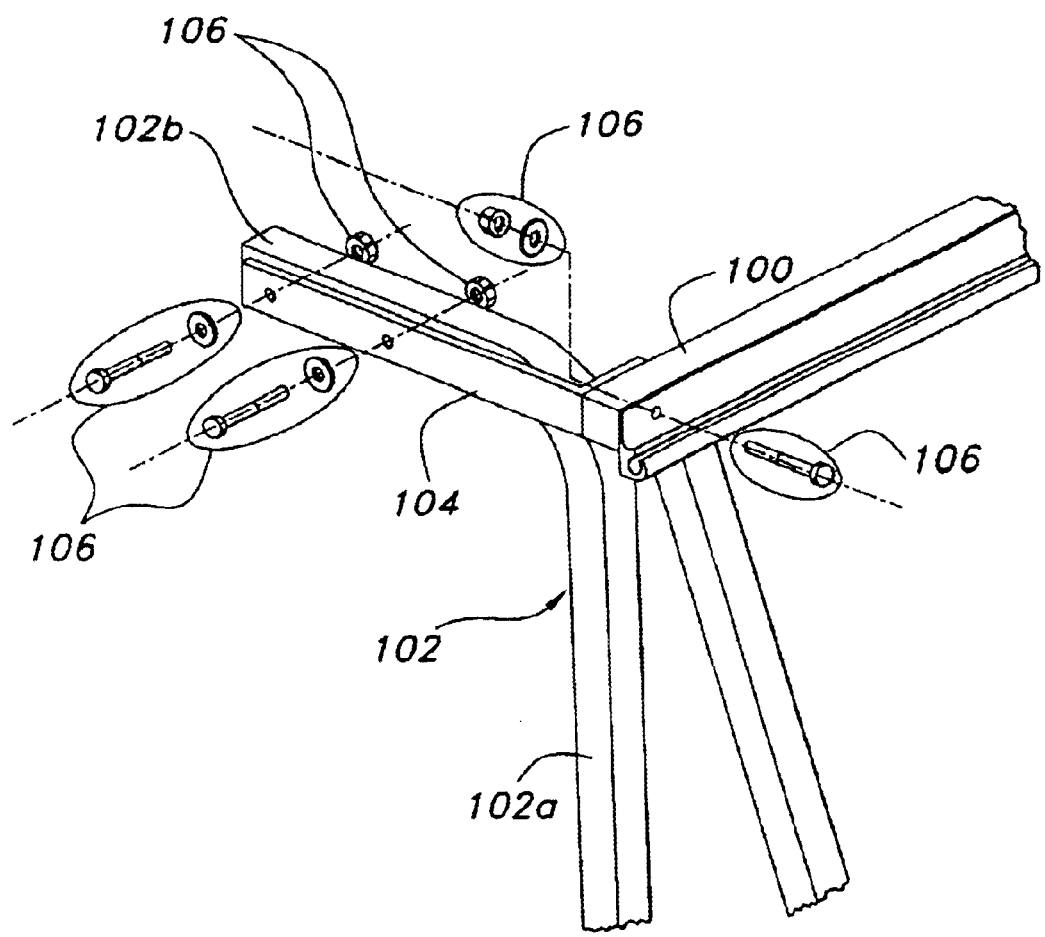
FIG. 4 is a perspective view of the embodiment shown in FIG. 3

FIG. 3 illustrates a perspective view of a stationary main frame 100 of another embodiment of the invention. FIG. 4 illustrates a perspective view of the stationary main frame 100 mounting to a rear support frame 102 of an alternative type of motorized golf cart. In this embodiment, the stationary main frame 100 is configured to be connected to the upper portion of a rear support frame 102 of an alternative type of motorized golf cart. An alternative type of motorized golf cart has a different configuration of rear support frame 102 than the motorized golf cart described with respect to FIGS. 1 and 2. Typically, the rear support frame 102 of the alternative type of motorized cart includes two vertical arms 102a with a top horizontal portion 102b extending from the upper portion of each vertical arm, with the top horizontal portions 102b extending forward towards the front portion of the cart. Note that this differs from the rear support frame 12 of the motorized golf cart in FIGS. 1 and 2, which included two vertical arms 16a,b with a top horizontal portion 18a,b extending from the upper portion of each vertical arm 16a,b, with the horizontal portions extending towards each other and parallel with the rear portion of the cart.

A movable frame and cover as shown and described as 22 and 24 in FIG. 1 can be connected to the stationary main frame 100. Typically, the stationary main frame 100 connects to the upper portion 102b of the rear support frame 102 of an alternative type of motorized golf cart by way of one or more mounting arms 104. Similar to the embodiment shown and described in FIG. 1, the cover 24 connects to the movable frame 22, and the movable frame 22 connects to the stationary main frame 100 so that both the movable frame 22 and cover 24 can pivot with respect to the stationary main frame 100 and the golf cart. The stationary main frame 100 is further described in FIGS. 5–8.

In some instances, the stationary main frame 100 can be configured with a quick-connect type fittings 106 to permit rapid connection and disconnection of the stationary main frame 100 with the upper portion of the rear support frame 102 of an alternative type of motorized golf cart. This provides a user with the option of rapidly connecting the stationary main frame 100, the movable frame 22, and the cover 24 when the invention is needed; or alternatively, disconnecting the stationary main frame 100, the movable frame 22, and the cover 24 when the invention is not needed. Quick-connect type fittings can include, but are not limited to, a conventional bolt with a corresponding nut, or any other type of device that can be used to connect a stationary main frame to a portion of the support frame of an alternative type of motorized golf cart in a relatively quick manner without the need for mechanized tools or equipment.

Figure 5:
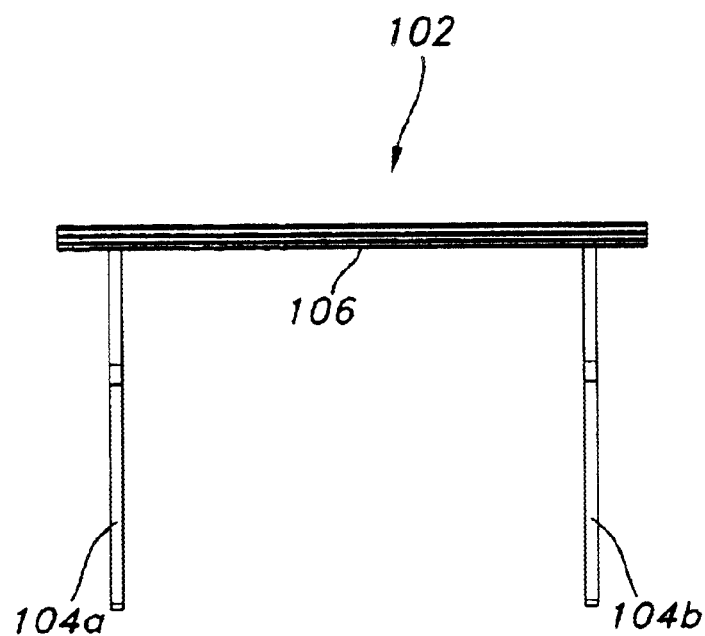
FIG. 5 is a rear view of the embodiment shown in FIG. 3.

FIG. 5 is a rear view of a stationary main frame of the embodiment illustrated in FIG. 3. As shown in FIG. 5, a stationary main frame 100 can be a square-"U-shaped" frame made from approximately 1" square tubing. The stationary main frame 100 includes a pair of arm tubes 108a,b and a connecting tube 110 disposed between the arm tubes 108a,b. Each arm tube 108a,b is slightly angled at the middle portion of each arm tube 108a,b. The connecting tube 110 is substantially straight along its length.

Figure 6:
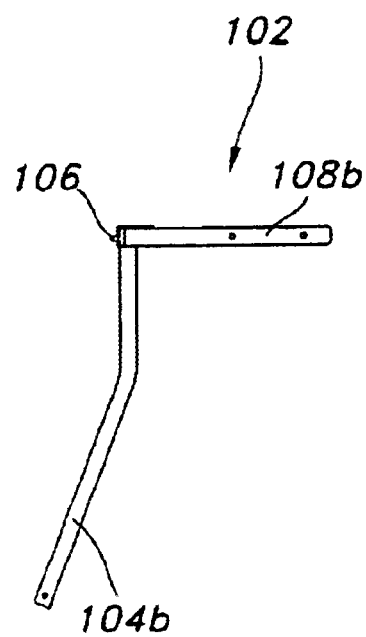
FIG. 6 is a side view of the embodiment shown in FIG. 3.
Figure 7:
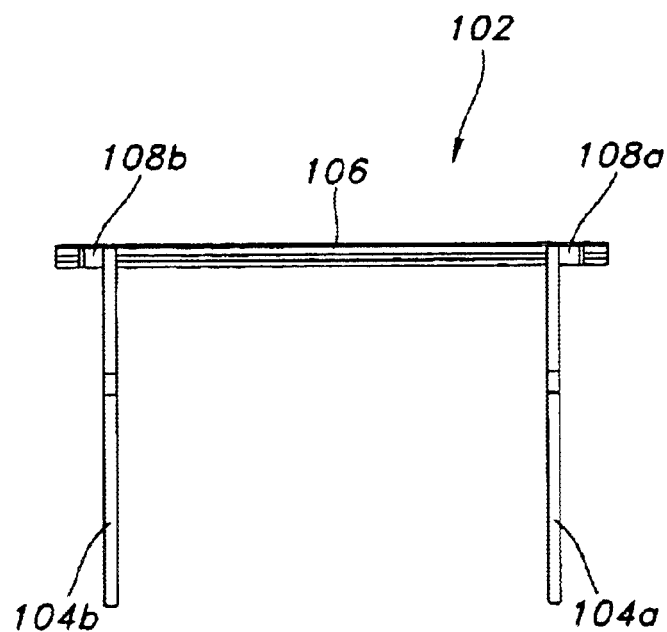
FIG. 7 is a front view of the embodiment shown in FIG. 3.
Figure 8:
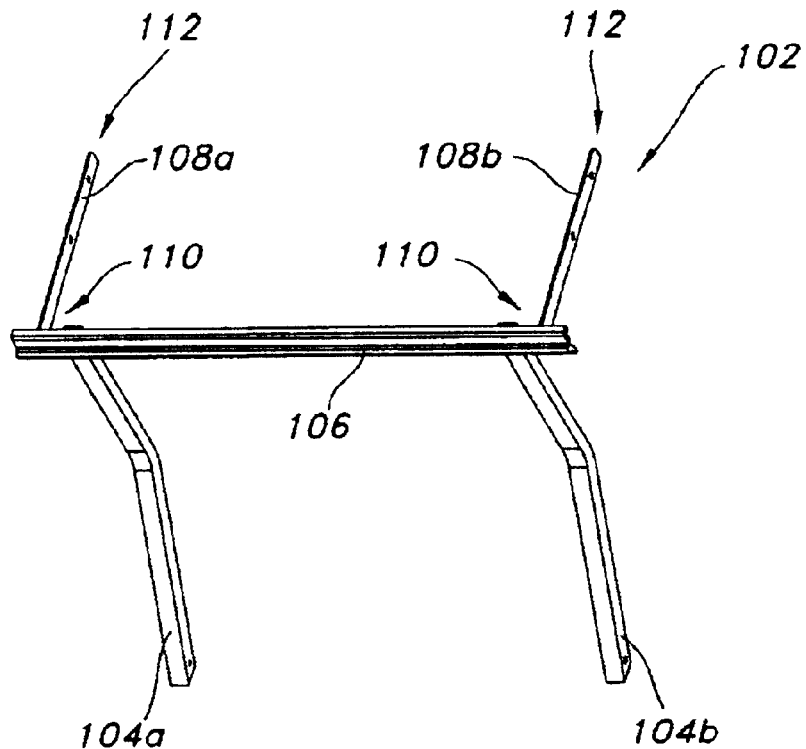
FIG. 8 is an upper perspective view of the embodiment shown in FIG. 3.

FIG. 6 is a side view of the stationary main frame 100 as depicted in FIGS. 3–4. FIG. 7 is a front view of the stationary main frame 100 as illustrated in FIGS. 3–6. FIG. 8 is an upper perspective view of the stationary main frame 100 shown in FIGS. 3–7. As shown in FIGS. 6 and 8, the stationary main frame 100 also includes a pair of mounting arms 110a,b. The mounting arms 110a,b are "L-shaped" brackets, with one end 112 configured to connect to the connecting tube 110 and the opposing end 114 configured to connect to the upper horizontal portions 102b of a rear support frame 102 of an alternative type of motorized golf cart. The mounting arms 110a,b are positioned so that the opposing ends 114 of each mounting arm 104 extend away from the connecting tube 110, and a portion of each mounting arm 104 is substantially perpendicular to the connecting tube 110. Each mounting arm 104 can be made from 1" flat bar that is bent at approximately a 90 degree angle in the central portion of each arm's 104 length. The length of each mounting arm 104 extending towards the opposing end 114 is typically machined with one or more holes to receive bolts or other similar types of connectors 106 to mount the arms 104 to the upper horizontal portions 102b of a rear support frame 102 of an alternative type of motorized golf cart. Bolts or similar types of connectors 106 can be used to connect the other end 112 of each mounting arm 104 to the connecting tube 110.

As shown in FIG. 4, when the connecting tube 110 is oriented in a substantially horizontal position, the mounting arms 104 can extend parallel with the upper horizontal portions 102b of the rear support frame 102 of an alternative type of motorized golf cart. The mounting arms 104 of the connecting tube 110 can then connect to the upper horizontal portions 102b of the rear support frame 102 of an alternative type of motorized golf cart. When the mounting arms 104 are secured to the top horizontal portions 102b of the rear support frame 102, the stationary main frame 100 remains in a relatively fixed position with the respect to the rear support frame 102 of an alternative type of motorized golf cart.

When the connecting tube 110 is oriented in such fashion, the arm tubes 108a,b extend downward from each end of the connecting tube 110 (as shown in FIGS. 5–8) so that the arm tubes 108a,b are substantially parallel with but not in contact with the vertical arms 102a of the rear support frame 102 of an alternative type of motorized golf cart. A movable frame, similar to that shown and described as 22 in FIG. 1, can be secured to the extended ends of the arm tubes 108a,b so that the movable frame 22 can pivot and rotate with respect to the stationary main frame 100. When the movable frame 22 is connected to the stationary main frame 100, a cover similar to that shown and described as 24 in FIGS. 1–2 can be supported by the movable frame 22 and secured to the stationary main frame 100.

Note that while the configuration and position for mounting the stationary main frame 100 has been modified in FIGS. 3–8, the configuration and operation of the movable frame and cover remain substantially the same as in FIGS. 1–2. Furthermore, as disclosed in FIG. 1, other configurations of the cover retainer strip 46, the cover retainer bar 34, and the recess 48 exist to connect the cover 24 to the cover retainer strip 46.

Alternative embodiments will become apparent to those skilled in the art to which the invention pertains without departing from its spirit and scope.

The invention we claim is:

1. An apparatus for covering a portion of a rear compartment of a golf cart, and configured for attachment to a support frame of a golf cart, wherein the support frame supports a hard rooftop for the golf cart, the apparatus comprising:
    a stationary frame member configured for mounting to an upper rear portion of the support frame of the golf cart, the stationary frame member comprising a U-shaped frame with a horizontal portion and two legs extending relatively perpendicular from the ends of the horizontal portion;
    a movable frame member mounted to the stationary frame member, and further configured to pivotably rotate over a portion of the rear compartment of the golf cart; and
    a cover configured for mounting to the movable frame member so that when the movable frame member rotates over a portion of the rear compartment of the golf cart, the cover covers a portion of the rear compartment of the golf cart,
    wherein the horizontal portion of the stationary frame member mounts to the support frame of the golf cart.

2. The apparatus of claim 1, wherein the stationary frame member connects to a horizontal portion of the support frame.

3. The apparatus of claim 1, wherein the movable frame member comprises a U-shaped frame with a horizontal portion and two legs extending relatively perpendicular from the ends of the horizontal portion.

4. The apparatus of claim 3, wherein each leg of the movable frame member mounts to a respective leg of the stationary frame member.

5. The apparatus of claim 1, further comprising:
    a retainer bar strip configured to mount to the stationary frame member, wherein the retainer bar strip includes a channel; and
    a retainer bar wherein a portion of the retainer bar fits within the channel; and further
        wherein a portion of the cover fits within the channel when the retainer bar is positioned within the channel.

6. The apparatus of claim 5, wherein the cover is sufficiently flexible to extend from the retainer bar strip and over a portion of the rear compartment of the golf cart when the movable frame member rotates aver a portion of the rear compartment of the golf cart.

7. The apparatus of claim 1, further comprising:
    a strap configured to restrain the cover adjacent to the stationary frame member to permit access to the rear compartment of the golf cart.

8. The apparatus of claim 1, further comprising:
    means configured for rapidly connecting the stationary frame member to the support frame, and further configured for rapidly disconnecting the stationary frame member from the support frame.

9. The apparatus of claim 8, wherein means configured for rapidly connecting the stationary frame member to the support frame, and further configured for rapidly disconnecting the stationary frame member from the support frame is a set of conventional bolts and corresponding nuts.

10. A method for covering a rear compartment of a golf cart having a support frame with at least one support member to support a hard roof top over the golf cart, the method comprising:
    mounting a horizontal portion of a stationary frame member to an upper rear support member of the support frame;
    mounting a movable frame member to the stationary frame member, the movable frame member configured to rotate to cover a portion of the rear compartment of the golf cart; and
    mounting a flexible cover to the movable frame member so that when the movable frame member covers a portion of the rear compartment of the golf cart, a portion of the flexible cover covers a portion of the rear compartment of the golf cart.

11. The method of claim 10, further comprising:
    mounting a tie-down to the cover so that the cover can be connected to either the support frame or the stationary frame member when the movable frame member is rotated to uncover a portion of the rear compartment of the golf cart.

12. An apparatus for mounting to a golf cart with a rear support frame which supports a portion of a hard roof cover for the golf cart, the apparatus comprising:

a stationary main frame connected to the rear support frame, the stationary main frame comprising:
a U-shape frame with
a pair of arm tubes, and
a connecting tube between the arm tubes, wherein the connecting tube mounts to the rear support frame of the golf cart;
a movable frame connected to the stationary main frame, the movable frame comprising:
a U-shape piece with
two arm bars, wherein at least one arm bar connects to the stationary main frame; and
a connecting bar between the two arm bars, wherein the movable frame can rotate over a portion of the rear compartment of the golf cart;
a cover retainer strip connected to the stationary main frame, comprising:
an elongate strip; and
a channel recess extending along a portion of the elongate strip; and
a cover connected to the cover retainer strip, wherein the cover extends from the channel recess and over the movable frame when the movable frame is rotated over a portion of the rear compartment of the golf cart.

13. The apparatus of claim 12, further comprising:
a cover retainer bar configured to slide within the channel recess to support a portion of the cover within the channel recess.

14. The apparatus of claim 12, further comprising:
a tie-down configured to connect a portion of the cover to either the stationary main frame or the rear support frame when the movable frame is not rotated over a portion of the rear compartment of the golf cart.

15. The apparatus of claim 12, wherein the stationary frame member connects to a horizontal portion of the rear support frame.

16. The apparatus of claim 14, wherein the tie-down is a hook and loop strap.

17. The apparatus of claim 12, further comprising:
means configured for rapidly connecting the stationary frame member to the support frame, and further configured for rapidly disconnecting the stationary frame member from the support frame.

18. The apparatus of claim 17, wherein means configured for rapidly connecting the stationary frame member to the support frame, and further configured for rapidly disconnecting the stationary frame member from the support frame is a set of conventional bolts and corresponding nuts.

19. A method for covering a rear compartment of a golf cart having a support frame to support a hard rooftop over the golf cart, the method comprising:
rotating a movable frame member relative to a stationary frame member, wherein
the stationary frame member is mounted to an upper rear portion of the support frame,
the movable frame member is mounted to the stationary frame member; and
the movable frame member is configured to cover a portion of the rear compartment of the golf cart.

20. The method of claim 19, further comprising:
extending a flexible cover configured for covering a portion of the rear compartment of the golf cart, wherein the flexible cover extends from a portion of the stationary frame member and over a portion of the movable frame member when the movable frame member covers a portion of the rear compartment of the golf cart.

21. The method of claim 19, further comprising
restraining a flexible cover configured for covering a portion of the rear compartment of the golf cart, wherein the flexible cover is held adjacent to the stationary frame member when the movable frame member is rotated towards the stationary frame member.

* * * * *

UNITED STATES PATENT AND TRADEMARK OFFICE
CERTIFICATE OF CORRECTION

PATENT NO. : 6,805,396 B2  Page 1 of 1
APPLICATION NO. : 10/080270
DATED : October 19, 2004
INVENTOR(S) : True et al.

It is certified that error appears in the above-identified patent and that said Letters Patent is hereby corrected as shown below:

DRAWING SHEET 2, FIG. 2 SHOULD READ.

--  --

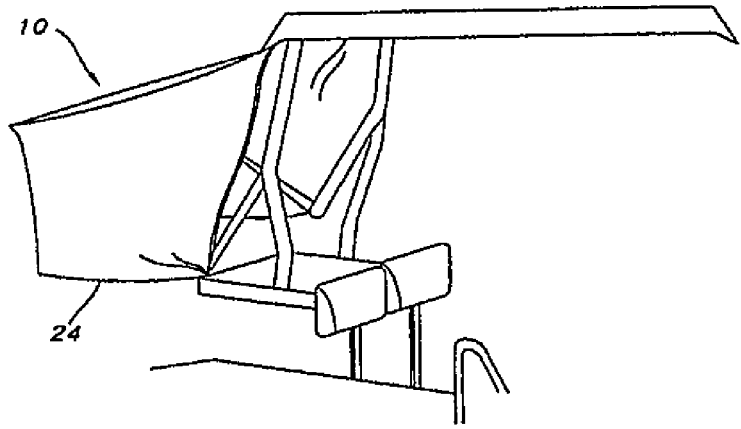

FIG. 2

Signed and Sealed this

Thirteenth Day of November, 2007

JON W. DUDAS
*Director of the United States Patent and Trademark Office*